A. LACKMAN.
MANUFACTURE OF FORMATES AND OXALATES.
APPLICATION FILED JULY 24, 1917.
1,274,169.
Patented July 30, 1918.
4 SHEETS—SHEET 2.
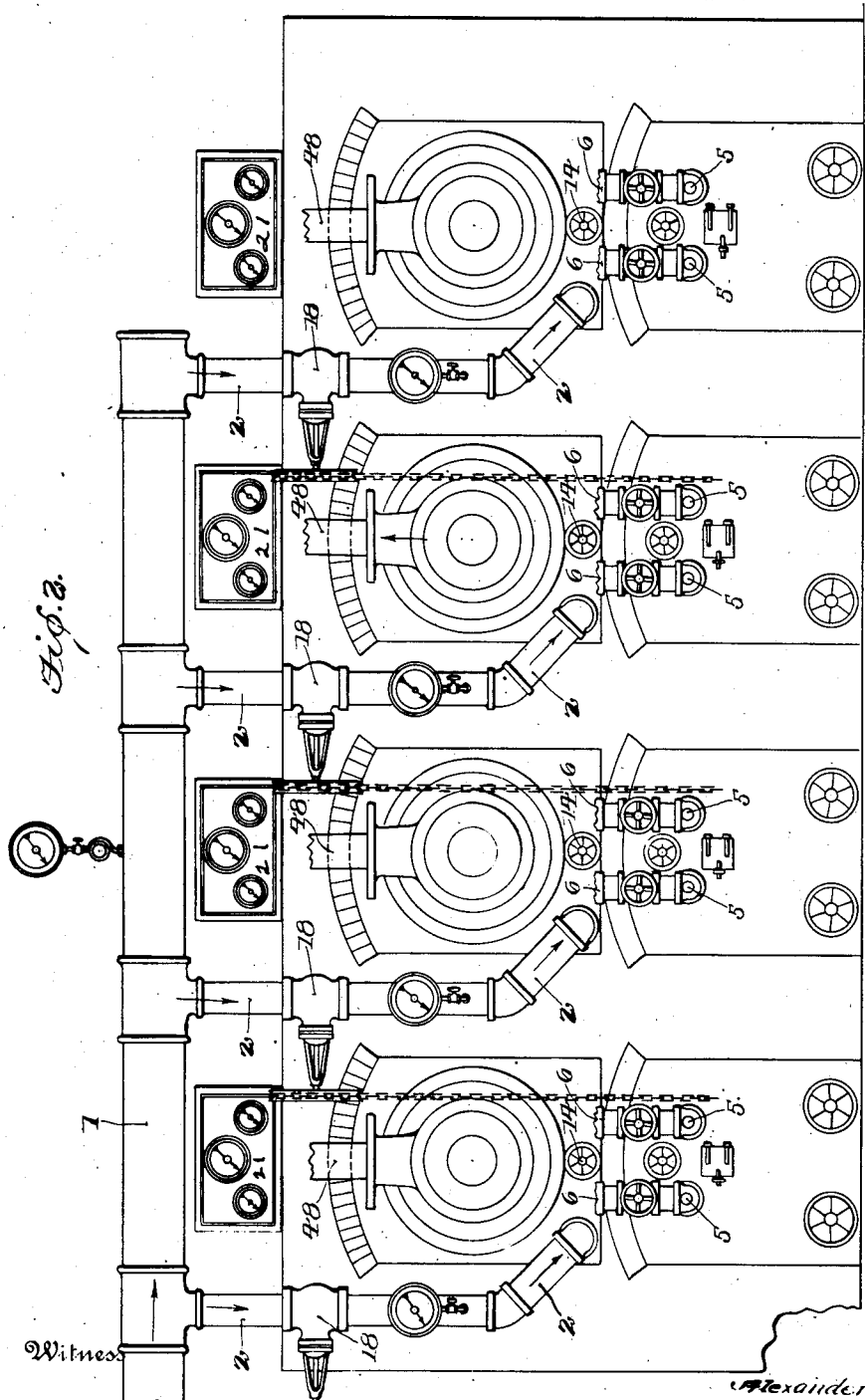

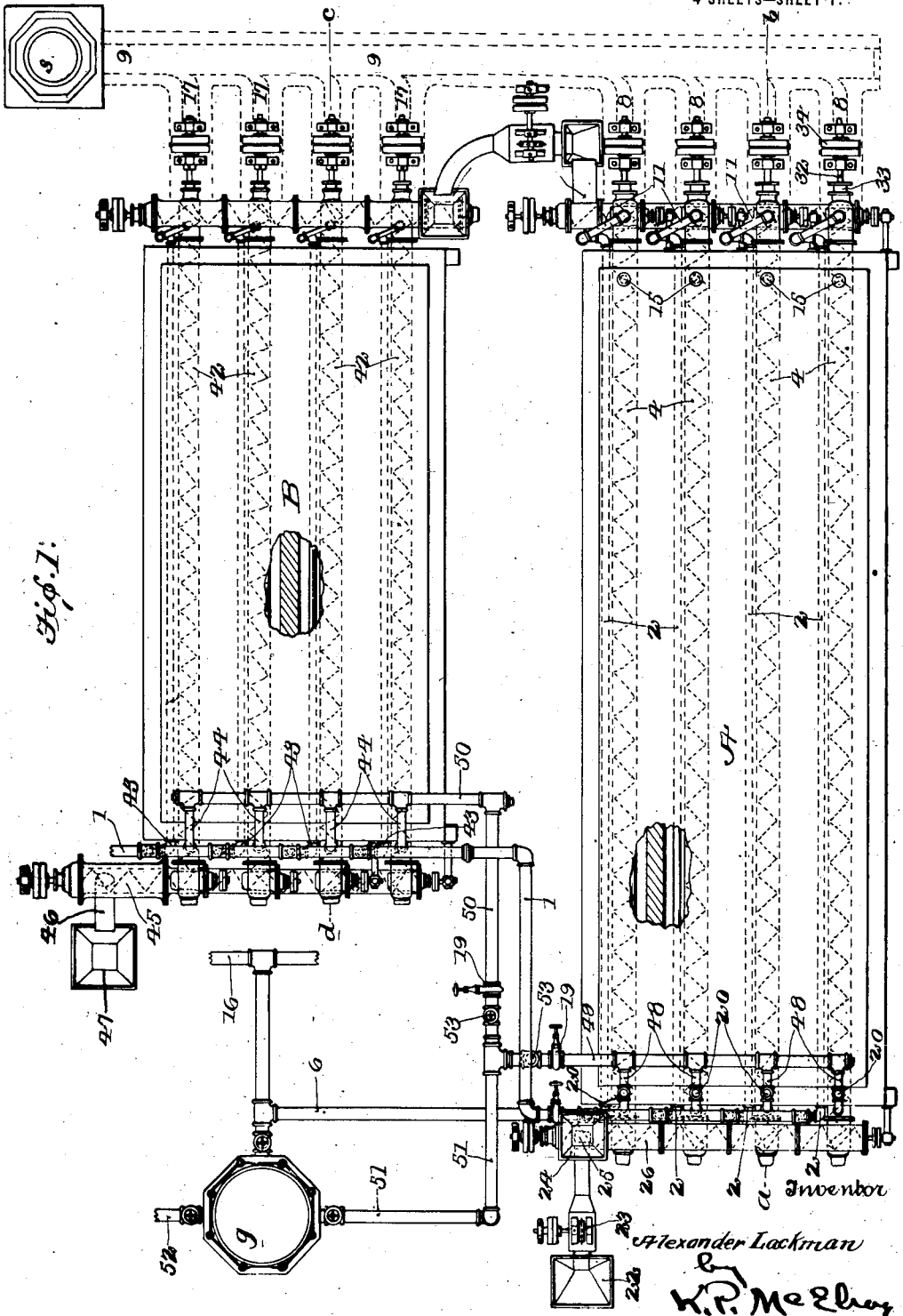

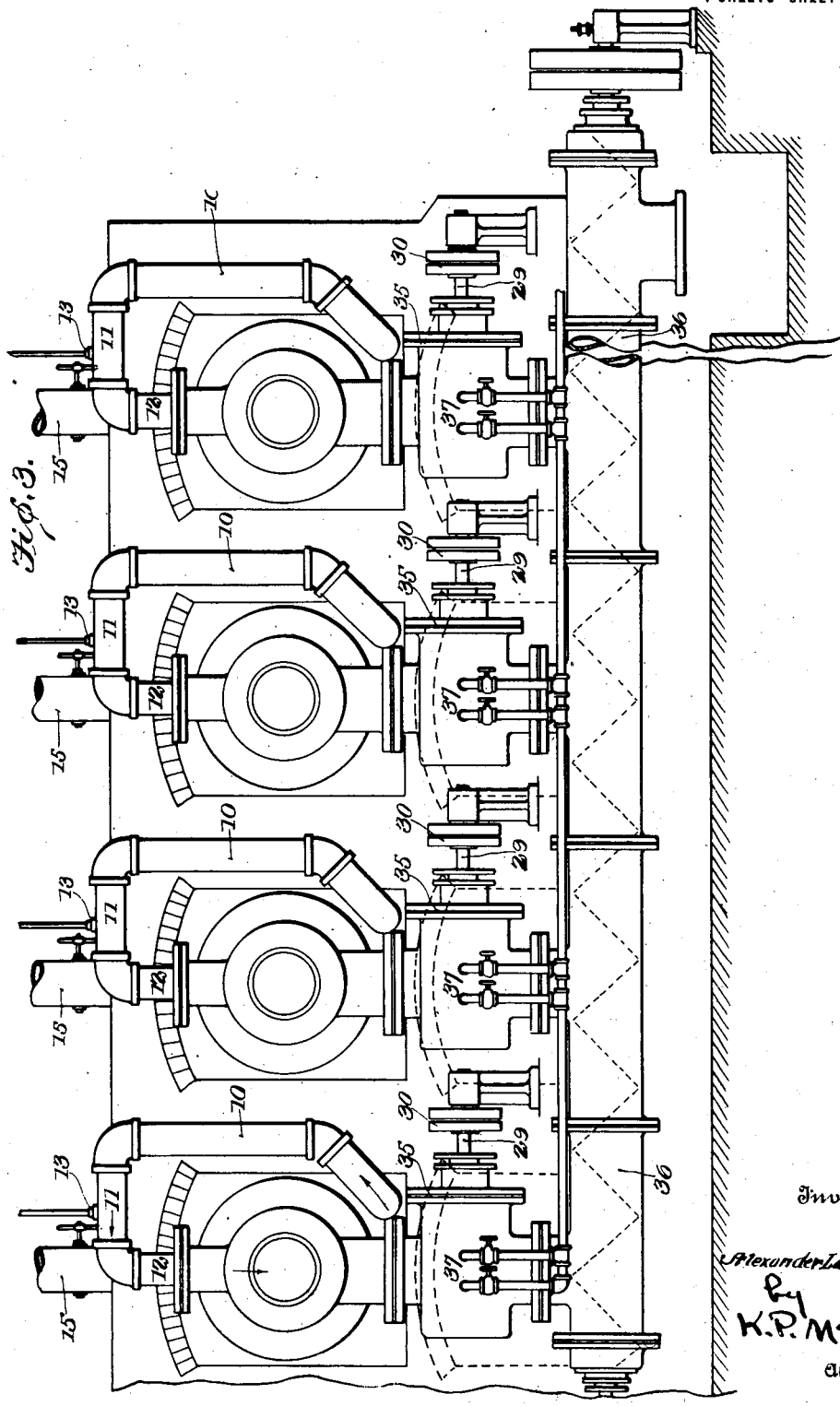

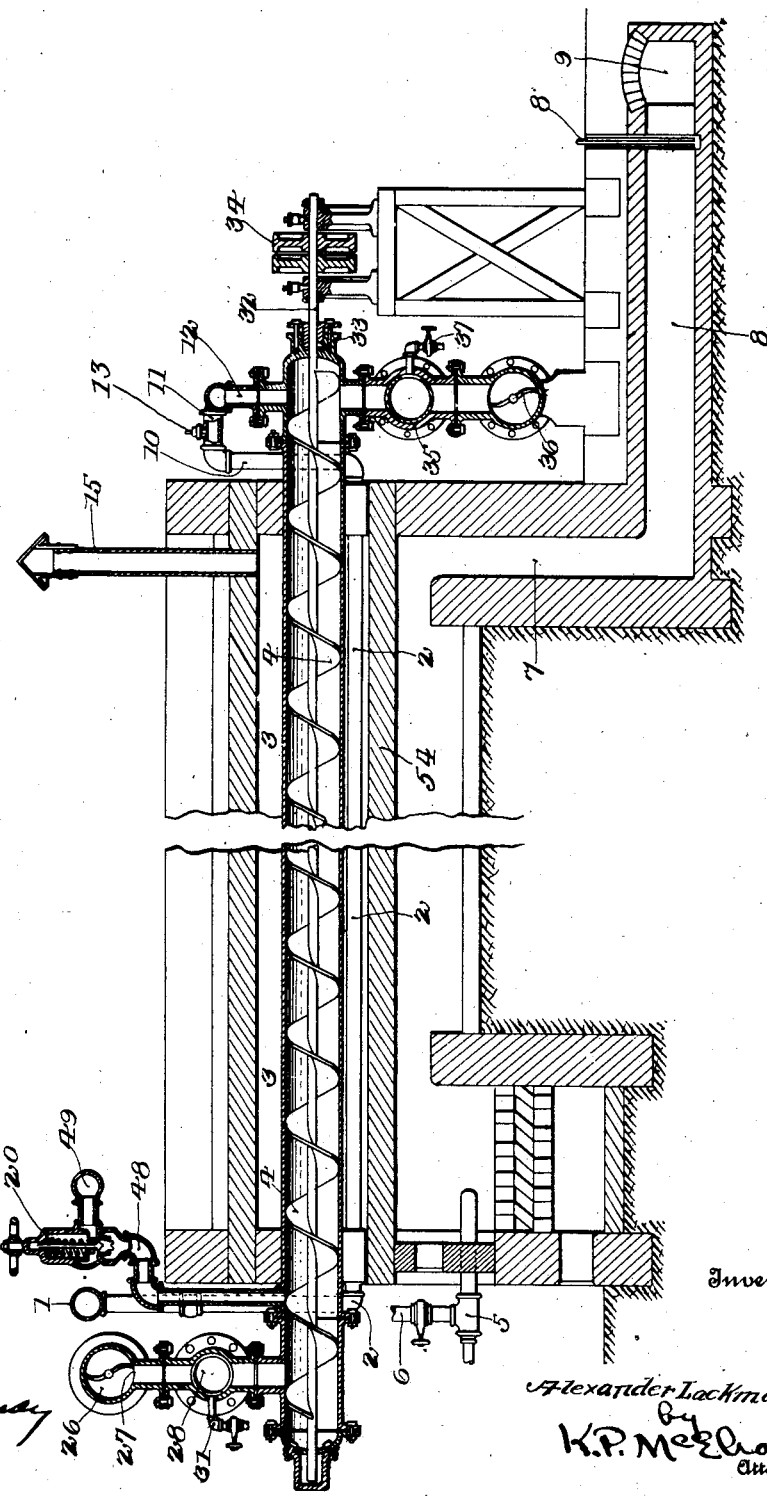

UNITED STATES PATENT OFFICE.

ALEXANDER LACKMAN, OF BRADFORD, PENNSYLVANIA.

MANUFACTURE OF FORMATES AND OXALATES.

1,274,169.

Specification of Letters Patent.

Patented July 30, 1918.

Application filed July 24, 1917. Serial No. 182,534.

*To all whom it may concern:*

Be it known that I, ALEXANDER LACKMAN, a citizen of the United States, residing at Bradford, in the county of McKean and State of Pennsylvania, have invented certain new and useful Improvements in the Manufacture of Formates and Oxalates, of which the following is a specification.

This invention relates to the manufacture of formates and oxalates and it comprises a process wherein sodium formate and sodium oxalate are successively and continuously produced from sodium hydrate with the aid of a gas containing carbon monoxid, such gas being held in contact with the material during the formate producing phase and during the oxalate producing phase, as in a process wherein powdered or granulated sodium hydrate (caustic soda) is moved as a thin traveling agitated stream through a tubular heated conduit in countercurrent against a stream of preheated gas as rich as possible in carbon monoxid, such gas carrying in a large part of the heat units necessary in the reaction, the travel of the sodium hydrate being continued until it is converted into formate, and then the formate is moved and agitated in a similar manner in a current of preheated and hot gas containing carbon monoxid, a part of the heat necessary for the reaction being here also conveyed into the reaction zone by means of such gas; and it also comprises certain details of operation in such a method; all as more fully hereinafter set forth and as claimed.

The manufacture of formate of sodium from sodium hydrate and gas containing CO is an old and well understood method. In operation however it suffers from certain inherent defects. It is an object of the present invention to obviate these inherent defects and render the operation simpler, more economical and more productive. It has been known for many years that CO reacts upon sodium hydrate in the sense of the following equation:—

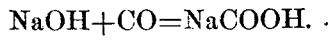

NaOH+CO=NaCOOH.

The reaction takes place under pressure fairly readily at comparatively low temperatures, say, 150 to 220° C. But a very high gas pressure is necessary for good results and in order to hasten the action, many other expedients have been employed; generally in the line of increasing the surface of the soda exposed to contact with the gas. For example, in the earliest embodiments of the method, the soda was used in the form of soda-lime or was mixed with coal or charcoal powder to give a maximum surface. Frequently the caustic soda was used in solution.

It has also long been known that sodium formate at a temperature around 400-450° C. breaks up by molecular rearrangement to form oxalate, the reaction going on in the sense of the following equation:—

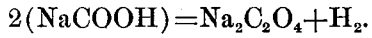

$$2(NaCOOH) = Na_2C_2O_4 + H_2.$$

It will be noted that in this action there is an evolution of hydrogen. While the reaction goes forward readily enough when the formate reaches and is at the correct temperature (under the particular method of operation) yet it is a very sensitive one. There is a strong tendency for the sodium formate at a somewhat lower temperature, at and below 360° C. to undergo a molecular change with production of sodium carbonate in the sense of the following equation:—

$$2NaCOOH = Na_2CO_3 + CO + H_2.$$

It will be noted that this reaction is attended with the evolution of CO and $H_2$. In making oxalate it is therefore necessary that the formate be brought as quickly as possible to a high temperature without lingering at lower temperatures.

I have found that by a simple method of operation I can render the whole reaction much more productive by taking into consideration the stated conditions in the operation. In lieu of attempting to heat masses of material in bulk, I perform all my heating operations on thin traveling agitated streams of material, passing the sodium hydrate in the formate phase through a comparatively narrow tubular retort containing the gases by means of a conveyer, thereby obtaining complete conversion under much lower gas pressure and without the necessity of using an undue amount of gas. The sodium formate so produced is sent through a similar conduit in the oxalate making phase in a similar way. By using agitated thin traveling streams of solid material in both operations, it is easier to raise the material to the quite exact temperature required while at the same time high capacity of apparatus is attained. Further, I convey much of the heat necessary for the action to the solid material by the simple expedient of preheating the gases fed into the reaction zone in each instance; this gas in the formate producing phase having also the function of furnishing CO. The same kind of gas that is used in making the formate is also used as an atmosphere in the oxalate forming phase. This offers the advantage that the formate producing phase and the oxalate producing phase may be allowed to overlap with resultant flexibility in the operation and simplicity of apparatus. While I shall hereinafter describe more particularly a process wherein the formation of sodium oxalate is the ultimate object yet I wish it to be understood that should sodium formate be desired the operation may be interrupted at the end of the formate producing phase.

In the formate production, water gas or "blue gas" may be employed; i. e., gas made by alternately blowing a coke or charcoal mass with air and with a current of steam to furnish a gas containing about equal proportions of CO and $H_2$. Soft coal may be used as an economical source of gases for the present purpose, a water gas generator being supplied with coke and operated in a well known manner; that is by alternately blowing with air to heat it up and running with steam to furnish water gas. The gas obtained in the blowing operation (regenerator gas) may be used for carbonizing the soft coal to furnish coke, thereby incidentally obtaining a mixed gas of high heat value. Instead of using blue gas made as described or in other ways, ordinary producer gas may be employed. This producer gas may be made by blowing ignited coal or coke with air or with air containing carbon dioxid or stack gases as an endothermic. Semi-water gas made by simultaneously blowing fuel with air (or air and products of combustion) and steam may also be employed.

Purified gas as free as possible from $CO_2$ and other impurities should be used both in the formate making operation and the oxalate making operation; and for both purposes the gas currents going into the reaction chambers are advantageously preheated.

In the accompanying illustration, I have shown more or less diagrammatically, a complete installation for the manufacture successively and continuously of sodium formate and sodium oxalate. In this showing Figure 1 is a diagrammatic plan view showing an apparatus comprising a unit of four sodium formate converters and a unit of four sodium oxalate converters;

Fig. 2 is a front elevation of the formate apparatus looking from left to right of Fig. 1; feeding receivers and cross conveyer being omitted for clearness of illustration;

Fig. 3 is a rear elevation looking from right to left of element A in Fig. 1 and showing receivers and cross conveyer, but omitting the shafts and pulleys of the converters;

Fig. 4 is a longitudinal section along line a—b of Fig. 1 of the formate apparatus.

A greater or less number of converters than those shown may form a unit.

The feeding and discharging means of the oxalate apparatus are similar.

In the drawings and referring particularly to Fig. 1, gas rich in carbon monoxid, such as producer gas, mixed gas, water or blue gas, is supplied by a conduit 1 from a source not shown to the system for reaction purposes. As shown in this view, the formate apparatus is indicated by A and the oxalate apparatus by B.

As the temperatures required in the formate converters are not high (about 220° C.), I advantageously inclose these converters in a special heating chamber 3 (see Fig. 4) spaced away from a combustion chamber by a heat permeable wall 54, which may be made of fire brick. Through this heating chamber extend gas pipes 2 serving to supply the formate converters with preheated gas. Communication with the interior of the converter 4 is at 10, 11 and 12. Heat is supplied to a lower combustion chamber by gas burners 5 (see Figs. 2 and 4). These gas burners may be fed from gasometer g, Fig. 1, which serves to contain waste gases from the operation together with any excess of original gas. The burners are supplied by pipes 6. The combustion gases (see Fig. 4) pass through downtake 7 at the end of the furnaces and flues 8 and 9 to the smoke stack s (Fig. 1). Indicating thermometers 13 extend into these gas pipes and indicate the exact temperature of the preheated gas going into the converters. The temperature in the heating chamber can be regulated by supplying more or less gas to the burners through mechanically regulated gas valves; by opening or closing the dampers 8' in the flues 8 (Figs. 1 and 4) or by opening or closing the small doors 14 (Fig. 2). In order to permit a further control of temperature in the heating chamber for the formate converters, these chambers may be provided with small supplementary venting stacks 15 which will give enough draft to suck some cold air through the heating chamber in the event the temperature tends to rise too high. For this purpose doors 14 are opened.

The structure of the oxalate apparatus is much the same as is shown in Fig. 4, save that the brick wall 54 is shortened, allowing the furnace gases to bathe the oxalate converters. This is for the reason that the temperatures required for the oxalate converters are higher, say, about 440° C. The circulation of the heating gases in these converters is shown in dotted line in B, Fig. 1.

The combustion gases go through the heating chamber from the back of the oxalate apparatus (the side indicated by $d$) to the front (indicated by $c$, Fig. 1). Heat is supplied by gas burners fed from the gasometer through pipe 16.

The temperature of the oxalate converters may be regulated in various ways, as by burning more or less gas; by mechanically regulating gas valves, or by dampers in the flues 17 (Fig. 1).

Purified gas containing carbon monoxid and as free as possible of $CO_2$ is supplied by the main gas line 1. From this gas line it is supplied to the whole system, the supply being regulated by valves 18 (see Fig. 2). As shown in Fig. 2, the supply is to the formate converters but the oxalate converters are similarly supplied. The valves communicating with the oxalate converters are omitted for the sake of clarity of illustration. Tail gases from both sets of converters are led to the gasometer through suitable gas conduits or pipes which may be closed by valves 19 (see Fig. 1). In starting up the apparatus air contained in the converters may be released through small petcocks (not shown) placed on these pipes.

The formate converters are usually run under pressure and are provided, for this purpose, with pressure regulating valves 20 (see Figs. 1 and 4.) These valves are set for the desired pressure. The amount of gas fed in is regulated by valves 18. In the oxalate making operation the gas feeding valves of the preheating gas pipes of the oxalate converters are nearly closed, so that only a small stream of carbon monoxid containing gas goes through these pipes. In order to be sure that there is no leak, the whole system can be held under pressure for a test by closing the feeding valves. So long as the valves 19 are not opened and there is no leak, the pressure remains constant. When assured that there is no leak the ovens are fired. The indicating thermometers 21 (Fig. 2) are located in different places in the heating chambers and when the temperature in the formate ovens as well as in the oxalate ovens is reached, the process can be started.

Sodium hydrate powder is then dumped into the hopper 22 (Fig. 1) whence the cup elevator 23 lifts it to the hopper 24 and from here it is dumped into the cross conveyer 26 regulated by the damper 25. The cross conveyer 26 charges the receivers 28, the charges being regulated by dampers 27, (Fig. 4). These receivers are cylindrical vessels tightly inclosed in another cast iron cylinder and here adapted to be rotated. They are driven by the shaft 29 and pulley 30 (Fig. 3). There is only one open space in the inner cylinder of these receivers and when this open space is at its highest point it registers with the tube connection of the cross conveyer whereupon the sodium hydrate powder runs into the receiver. When the receiver is turned with its open space down, the sodium hydrate is discharged into the formate converter and the other portion of the receiver seals the opening of the tube connection. In the converters the powder is moved by a screw conveyer 4' or the like, through the heated tubes. Instead of using the rotary receiver, cylinders with horizontal removable rod and piston disks can be used. These take and discharge the soduim hydrate and the sodium formate from the cross conveyer. Since the gas going through the formate and oxalate converters is under more or less pressure, the special means for delivering the sodium hydrate to the formate converters and the sodium formate to the oxalate converters is very important. It makes possible the operation of both processes under definite pressures without loss of gas. The gas outlets 31 and 32 (Fig. 4) in the outer cylinder release the gas in the receivers when the opening space of the inner vessel reaches the outlets. The released gas goes to the furnaces by 37.

Fig. 4 shows the converter 4, the shaft 32, stuffing boxes 33 and drive pulleys 34. The caustic soda powder is moved through the formate converters against the carbon monoxid carrying gas and since the converter and gas are heated to about 220° C., the caustic soda will soon have the same temperature. The sodium hydrate powder being in only a thin layer in the converter and steadily moved it comes into very intimate contact with the preheated carbon monoxid gas, giving the most favorable conditions for converting the sodium hydrate into sodium formate. Only a low pressure of the gas in these converters is necessary to secure efficient absorption. Further the outgoing sodium formate at the end of the converter comes into contact with the richest preheated carbon monoxid gas, which insures that any remaining sodium hydrate shall be converted into formate before discharge.

The sodium formate is discharged at the end of the converters, through outlets dumping it into receivers 35 (Figs. 3 and 4). These receivers are similar in operation to the inlet receivers described, with the exception that dampers are not necessary. The sodium formate removed by these devices from the converters goes to the cross conveyer 36 (Figs. 3 and 4). The gas outlets 37 release the gas from the receivers and this gas is also piped to the furnaces. Further, a gas outlet at the end of the cross conveyers (not shown in the illustration) may be connected with a jet to take away any gas which may escape. It may be blown into the furnace to burn it and render it harmless. The sodium formate is either sent to a place of storage or is delivered through the chute 38 (Fig. 1) and is lifted by a cup elevator 39 to chute 40 and to hopper 41 of the oxalate apparatus B to be converted into sodium oxalate.

Instead of mounting the formate apparatus and oxalate apparatus at substantially the same level, the formate apparatus may be mounted above the oxalate apparatus, rendering possible some simplification of the conveying means used and also some simplification of the heating.

Describing now more particularly the oxalate apparatus indicated as a whole by B (Fig. 1), the sodium formate is delivered into the oxalate converters 42 in the same way as the caustic soda powder is distributed to the formate converters. Fig. 4 serves equally as well as cross section of the oxalate apparatus under the present invention along line $c$—$d$, with the difference that the front view with the charging means is at $c$ and the back view with the discharging means of the sodium oxalate converter is at $d$ and that the preheating gas pipes 43 enter the chambers at the back end of the ovens at $d$ and leave the ovens at the front end at $c$. The gases enter the converters where the sodium formate is charged. The tail gas pipes 44 (Fig. 1) have no pressure regulating release valves but they are fitted with check valves—not shown—and the chambers have no air stacks (15), as the combustion gases go back through the heating chambers to the front of the furnace chamber and through flue 17 to the smoke stack.

The sodium formate entering the heated oxalate converters comes into contact with preheated gas of the same character as that used in the formate converters.

Since this gas is preheated to about 440° C. it aids in quickly bringing the sodium formate which is moved through the converters from $c$ toward $d$ to the oxalate producing temperature; and since it is rich in carbon monoxid, any sodium hydrate which may have been left unconverted in the sodium formate apparatus will be here also converted into sodium formate before the high temperature is reached. As the converters and the gas going with the sodium formate through these converters are both heated to about 440° C., the sodium formate cannot remain at 360° C. or below this temperature any length of time so that the dangerous temperatures are precluded and conversion of the sodium formate into sodium carbonate is avoided. The conversion of sodium formate into sodium oxalate takes place quickly as soon as a temperature above 360° C. is reached. No sudden or tumultuous evolution of large quantities of hydrogen can take place to give rise to explosions or troubles in the converter. The sodium formate moves through the converting zone in successive small quantities, each of which successively reaches the converting temperature at which evolution of hydrogen occurs; and the evolution is continuous.

It is therefore not necessary to operate these oxalate converters under vacuum or to mix diluting bodies, such as sodium carbonate, hydrate or oxalate, with the sodium formate. The oxalate converters may be operated under a very low gas pressure, such as that of the gas in the gasometer $g$. At the rear end of the oxalate apparatus at $d$, (Fig. 1) the sodium oxalate is removed from the oxalate converters and delivered through a device similar to that used for dumping the sodium formate from the formate converters and shown in Fig. 3. The end part of the cross conveyer 45 (Fig. 1) is jacketed and cooled with circulating water and the cooled sodium oxalate is discharged through the chute 46 into the hopper 47, whence it can be lifted to a place of storage or to an apparatus adapted to dissolve and decompose it with milk of lime to form calcium oxalate and caustic soda, in the manner usual in the manufacture of oxalic acid. The tail gas coming from the formate converters and robbed of most of its carbon monoxid is led by pipes 48 into gas conduit 49 and through pipe 51 into the gasometer $g$. Similarly the tail gas from the oxalate converters is led by pipes 44 into gas conduit 50 and pipe 51 into the gasometer.

Both conduits 49 and 50 are similarly fitted with valves 19 and check valves 53. The tail gas from the oxalate converters contains all the hydrogen coming from the conversion of the sodium formate into oxalate and mixes in pipe 51 with the tail gas from the formate converters, giving a mixed gas in the gasometer very well adapted for heating the apparatus. The surplus gas from the producers or generators or so much of this original gas as may be needed for heating purposes, may be added to the mixed gas in the gasometer through conduit 52 (Fig. 1).

To control both processes samples of the discharged sodium formate as well as of the converted sodium oxalate, are taken and tested at intervals. To facilitate testing, holes fitted with plugs are bored in the tube connections of the discharging receivers, and the cross conveyer, large enough to introduce a small spoon for taking the samples of the dumped converted products. These tests will indicate if both processes are going correctly, if more or less sodium hydrate has to be charged, if the temperature of the chambers of the ovens and of the preheated gases has to be corrected, whether the gas pressure in the formate converters should be lowered or raised, if the charges should be moved slower or faster through the converters and so on.

This renders both processes exceptionally accurate and economical.

The above description of the operation of the apparatus suffices to describe the several parts more particularly.

One advantage of the present process is that the supply of waste gases or tail gases can be economically used for producing the heat necessary. The mixed tail gases from the formate converters and oxalate converters give a mixed gas rich in heat units.

What I claim is:—

1. The process of making sodium formate which comprises passing granular caustic soda through a tubular heated conduit in countercurrent against preheated gas containing CO.

2. The process of making sodium oxalate which comprises transmitting granular sodium hydrate through a heated conduit in countercurrent to preheated gas rich in CO and transmitting the sodium formate produced through an externally heated tubular conduit in the presence of a flowing preheated gas containing CO.

3. The process of making sodium oxalate which comprises passing granular sodium formate through an externally heated conduit as a traveling stream in the presence of a flow of preheated gas rich in CO.

4. In the manufacture of formates and oxalates the process which comprises passing a traveling layer of granular caustic soda against a current of hot gases containing CO until the greater part of said soda is converted into formate, and converting the so-treated material into oxalate in the presence of sufficient CO to convert residual soda into formate.

5. In the manufacture of formates and oxalates the process which comprises transmitting granular caustic soda through a hot tubular retort against a current of CO-containing gases, removing it from the retort and transmitting it through a similar but hotter retort to produce oxalate, said similar retort being also supplied with a current of gases containing CO.

6. In the manufacture of formates and oxalates, the process which comprises transmitting sodium hydrate continuously through tubular fire-heated conduits in the presence of gas currents containing CO, such transmission first being under formate producing conditions and second under oxalate producing conditions and the waste gases from both operations being used for heating said conduits.

In testimony whereof, I affix my signature hereto.

ALEXANDER LACKMAN.